(12) United States Patent
Bates et al.

(10) Patent No.: US 6,709,335 B2
(45) Date of Patent: Mar. 23, 2004

(54) METHOD OF DISPLAYING MESSAGE IN AN INTERACTIVE COMPUTER PROCESS DURING THE TIMES OF HEIGHTENED USER INTEREST

(75) Inventors: Joseph Bates, Newton, MA (US); A. Bryan Loyall, Cambridge, MA (US); Paolo M. Piselli, Watertown, MA (US); Peter W. Weyhrauch, Newton, MA (US); Stanton E. Wood, Boston, MA (US)

(73) Assignee: Zoesis, Inc., Newton, MA (US)

( * ) Notice: Subject to any disclaimer, the term of this patent is extended or adjusted under 35 U.S.C. 154(b) by 0 days.

(21) Appl. No.: 09/955,678

(22) Filed: Sep. 19, 2001

(65) Prior Publication Data

US 2003/0130020 A1 Jul. 10, 2003

(51) Int. Cl.[7] .................................................. A63F 9/24
(52) U.S. Cl. ............................. 463/42; 705/14; 705/27
(58) Field of Search ......................... 705/14, 27; 463/42

(56) References Cited

U.S. PATENT DOCUMENTS

| | | | | |
|---|---|---|---|---|
| 5,781,894 A | * | 7/1998 | Petrecca et al. | 705/14 |
| 5,823,879 A | * | 10/1998 | Goldberg et al. | 463/42 |
| 5,946,664 A | * | 8/1999 | Ebisawa | 705/14 |
| 6,032,129 A | * | 2/2000 | Greef et al. | 705/27 |
| 6,036,601 A | * | 3/2000 | Heckel | 463/42 |
| 6,037,981 A | * | 3/2000 | Wilson et al. | 375/240.12 |
| 6,049,778 A | * | 4/2000 | Walker et al. | 705/14 |
| 6,183,363 B1 | * | 2/2001 | Ishihara et al. | 463/31 |
| 6,205,432 B1 | * | 3/2001 | Gabbard et al. | 705/14 |
| 6,264,555 B1 | * | 7/2001 | Glazman et al. | 463/1 |
| 6,285,985 B1 | * | 9/2001 | Horstmann | 705/14 |
| 6,332,127 B1 | * | 12/2001 | Bandera et al. | 705/14 |
| 6,338,044 B1 | * | 1/2002 | Cook et al. | 705/14 |
| 6,443,843 B1 | * | 9/2002 | Walker et al. | 463/42 |
| 6,446,261 B1 | * | 9/2002 | Rosser | 725/34 |
| 6,470,180 B1 | * | 10/2002 | Kotzin et al. | 455/412 |

OTHER PUBLICATIONS

Microsoft Corporation, Microsoft Combat Flight Simulator Manual, 1998, 44–45.*

Examiner's Affidavit.*

Peter Weyhrauch, "Guiding Interactive Drama" PhD thesis, School of Computer Science, Carnegie Mellon University, 1997.

* cited by examiner

Primary Examiner—Jessica Harrison
Assistant Examiner—Corbett B. Coburn
(74) Attorney, Agent, or Firm—Fish & Richardson P.C.

(57) ABSTRACT

A data processing system and method for executing a process for interacting with at least one user and displaying messages to the user at times of heightened user interest.

8 Claims, 3 Drawing Sheets

US 6,709,335 B2

METHOD OF DISPLAYING MESSAGE IN AN INTERACTIVE COMPUTER PROCESS DURING THE TIMES OF HEIGHTENED USER INTEREST

TECHNICAL FIELD

This invention relates to interactive media systems, and more particularly to message insertion.

BACKGROUND

A common model for getting revenue from television is to sell advertising space during television shows. Advertising space typically consists of 15-, 30-, or sixty second spots which occur periodically during the television show. One of the potential problems with inserting non-story content into the show is that viewers may switch stations during the advertisements. To increase the chances that a viewer will continue watching the show, advertising may be placed at moments in the story where there is a certain dramatic intensity that compels the viewer to see what happens next. This is sometimes referred to as a cliffhanger.

The reality is that for much of advertisement-sponsored television, the timing of the advertisements is fixed, and the story is written to carefully fit the structure. Because the television show is produced ahead of time, the show is carefully edited to adhere to the strict timing. This method has worked well for television for many years.

A growing alternative to the fixed script passive viewer television model of entertainment is interactive media. Interactive media includes a wide variety of electronically mediated activities in which one or more users interacts with an electronic system (e.g., a computer, a personal digital assistant, or a mobile telephone) and controls, at least partially, the progression of audio and/or visual information displayed to him or her. Interactive media includes traditional commercial video games, handheld video games, home computer games, and online network based games. Also included are non-game activities such as online chat rooms, and other forms of web browsing.

Typically, an interactive media system can be thought of as having one or more input ports for receiving inputs from users, one or more output ports for displaying information to users, and a processing system for receiving the inputs and generating the outputs. The processing system is a state machine, the state of which at any time is determined by the history of user inputs (and possibly random variables). The state at any given time affects how the processing system responds to further inputs from users.

A well known example of an interactive media system is a so-called Single-Player Fighting Game (SFG). In an SFG, a single player navigates a synthetic world trying to achieve various goals and encounters various obstacles and hazards along the way. To the extent the player succeeds in certain goals, he or she is made stronger, whereas failure to achieve certain goals (e.g., defending against an attack by a monster) can made the player weaker. In such a system, the processing system typically keeps track of the strength or weakness of the player by maintaining a state variable representing the player's "health", where a value of 100% represents the strongest possible health, and a value of 0% means that the player has been killed. The Quake game is a well-known example of an SFG.

Other specific examples of interactive media systems include a Text-Based Interactive Fiction Game like the DEADLINE(TM) game, Multiplayer Fighting Game like the QUAKE III ARENA(TM) game, a Turn-Based Strategy Game like the CIVILIZATION II(TM) game, a Two-Player Console Sports Game (like the INTERNATIONAL SUPER STAR SOCCER(TM) game), a Conventional Online Game like Chess (found, e.g., at the "freechess" web site), an Internet Chat like AOL's INSTANT MESSENGER CHAT(TM) service, and a mobile telephone game like the SNAKE(TM) game.

Although the sale of advertising space for interactive media offers a potential revenue source for interactive media system developers, it is difficult to apply the television-based advertising insertion model to interactive media. A central problem is that many forms of interactive media are unpredictable. Because the user's inputs determine, in part, the sequence of interactive events the user perceives, the sequence will typically not follow the story structure and strict timing that are necessary for inserting advertisements according to a fixed schedule. Although some interactive media systems (e.g., at the GAMESVILLE(TM) website) insert advertising at the conclusion of a game, these messages are relatively easy for a user to ignore, since the user has completed the activity that was keeping his or her attention.

SUMMARY

In general, in one aspect, the invention provides a method and apparatus, including a computer program apparatus, implementing techniques in a data processing system executing a process for interacting with at least one user, for executing the process for a period of time and, during execution of the process, at a moment of likely intensity of the user's interaction with the process, displaying a message to the user.

The techniques may include monitoring data about the process and determining the moment of likely intensity of the user's interaction with the process based on the results of the monitoring. Displaying the message may include suspending the process during the display of the message. The process may be a game process, and suspending the process may include temporarily halting the progress of the game while the message is being displayed, and continuing the progress of the game only after the message has been displayed. The process may be an online real time discussion medium and monitoring data about the process may include measuring the rate of message traffic in the medium. The process may be a fighting game having characters, and monitoring data about the process may include determining the relative health of a first character. The first character may be a character corresponding to a player. Measuring the intensity of the user's interaction may include determining the rate of message traffic in an interactive medium relative to the number of users of the medium. The process may include a simulated team ball game, and monitoring data about the process may include determining a measure of a likelihood of a player scoring. The process may include a game having one or more players, and wherein monitoring data about the process comprises determining a measure of likely change in a measure of success of a player in the game. The process may include a game having one or more players, and monitoring data about the process may include determining a change in a measure of success of a player in the game. A state of the process may be determined and the content of the message may be selected according to the state of the process. The process may include a game having simulated characters who interact with a character representing the user and a relationship between a particular simulated character and the character representing the user may be determined and the content of the message determined according to the identity of the simulated character. Determining the relationship may include determining a distance between the particular simulated character and the character representing the user and determining the content of the message may include selecting a message associated with the simulated character. The simulated character may be associated with a product or service, and the message may be an advertisement for the product or service. The techniques may include repeatedly displaying a message during the process, determining at least one waiting interval and waiting for a determined waiting interval between each message display. The process may include a game process, and interval of time may be determined according to an estimate or measure of the amount of time remaining in the game. The message may include an advertising message. The process may present an interactive drama to the user, and wherein the message may be not part of the dramatic storyline. Measuring data about the process may include monitoring the user's knowledge of a fact about the drama. Measuring data about the process may include monitoring the user's knowledge of a fact about the drama comprises estimating a degree of user certainty about whether the fact is true. Measuring data about the process may include providing an association between events within the interactive drama and thoughts that a user is likely to have in response to an event, and monitoring changes in the thoughts that a user is likely to be having based on one or more events that occurred in the drama. Measuring data about the process may include providing an association between events that have occurred within the interactive drama and goals of a user, and monitoring changes in the goals that a user is likely to have based on one or more events that have occurred in the drama. Measuring data about the process may include monitoring events that have occurred in the drama, monitoring the active goals of the user, and determining whether the events occurred by the user attempting to achieve one of the active goals. The data processing system may be connected to a network, and the content of the message may be received in the data processing system from the network. The process may include a game process, and monitoring data about the process may include comparing the user's score with a pre-existing recorded score. The message may include an interactive presentation. The message may include a fixed audio/video presentation. The data processing system may include a mobile telephone. The data processing system may include a personal digital assistant, a set top box, a game console, or a digital TV system. The process may include a game having simulated characters who interact with a character representing the user, a location of the character representing the user may be determined and the content of the message may be determined according to the location of the simulated character. The techniques may include determining an urgency of user response to the process and determining whether to display the message based on the urgency of user response. The techniques may include determining a geographical location of the user on the earth and determining the content of the message according to the location of the user. The techniques may include determining the interval of time according to an estimate or measure of likely intensity of the user's interaction with the process based on the results of the monitoring. The game may comprise a multi-user game operating over a network. Monitoring the process may include determining whether the process is in an urgent state, and it may be determined whether to display the message based on whether the process is in an urgent state. The process may include a character-based fighting game, and determining whether the process is in an urgent state may include determining whether a character associated with the user is within a line of sight of any enemies. Monitoring the process may include determining whether the process is in an urgent state, and the techniques may include resuming the process after the display of the message and modifying the state of the process to a non-urgent state after displaying the message and before resuming the process. The process may include a character-based fighting game, and determining whether the process is in an urgent state may include determining whether a character associated with the user is within a line of sight of any enemies. A history of the display of the interactive process may be recorded and, after displaying the message to the user, a portion of the recorded history may be redisplayed. An appropriate time for displaying the message may be determined and, in response to the determination, the likely intensity of the user's interaction by modifying the state of the process may be increased. The content of the message may be determined based on the contents of a user profile for the user.

In general, in another aspect, the invention provides a method and apparatus, including a computer program apparatus, implementing techniques for displaying messages in a mobile networked device including determining the location of the device, selecting a message for display based on the location of the device and displaying the message on the device.

The message may be an advertising message. The device may include a mobile telephone. The device may include a personal digital assistant. The advertising message may include an advertisement for a business in the same location as the device. The local time in the location of the device may be determined and the message may be selected based on the local time.

In general, in another aspect, the invention provides a method and apparatus, including a computer program apparatus, implementing techniques for displaying a message on a mobile networked device including determining the location of the device, selecting a message for display based on previously stored information about the user, and displaying the message on the device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
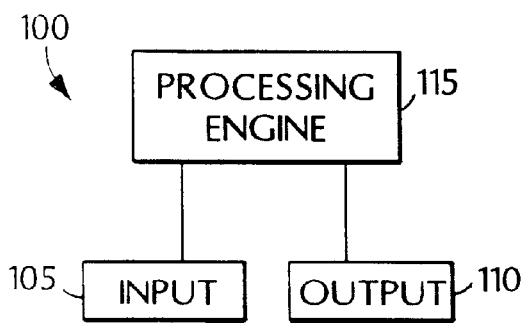
FIG. 1 is a block diagram showing schematic elements of an exemplary interactive media system.

Referring now to FIG. 1, an exemplary interactive media system 100 includes a user input 105, an output display 110, and a processing engine 115. user input 105 may be any known or yet to be developed device for receiving user inputs in an information processing system, such as a computer keyboard, a mouse, a joystick, a telephone pad, a touch screen, a remote control handset, microphone, video camera, or the like. Output display 110 may be any known or yet to be developed device for displaying audio or visual information generated by an information processing system, including a computer monitor, a television monitor, a personal digital assistant screen, a handheld interactive game screen, loudspeakers, headphones, a telephone display, and the like. Processing engine 115 may include any known or yet to be developed information processing system, including a stand alone personal computer, a dedicated handheld game system, a network of computers, a programmable telephone, a set top box, a game console, a digital TV system, or a personal digital assistant.

Figure 2:
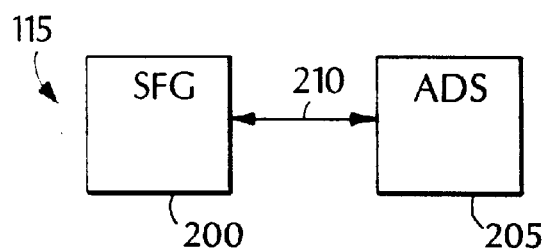
FIG. 2 is a block diagram showing schematic elements of an exemplary processing engine.

Referring now to FIG. 2, processing engine 115 includes a single-player fighting game (SFG) 200 and advertising delivery system (ADS) 205. Both SFG 200 and ADS 205 are data processing modules that may be implemented in hardware or software or a combination of both. SFG 200 is a conventional game module for implementing a single player fighting game. Such modules (e.g., Quake game software) are well known in the art. In this preferred embodiment SFG 200 implements a first person shooter game, but the invention works for non-first person games as well.

SFG 200 and ADS 205 are linked by a data channel 210. Data channel 210 enables ADS 205 to query the current state of SFG 200. The ADS may also send commands via data channel 210 to SFG 200, causing SFG 200 to pause a game or to resume a game.

Figure 3:
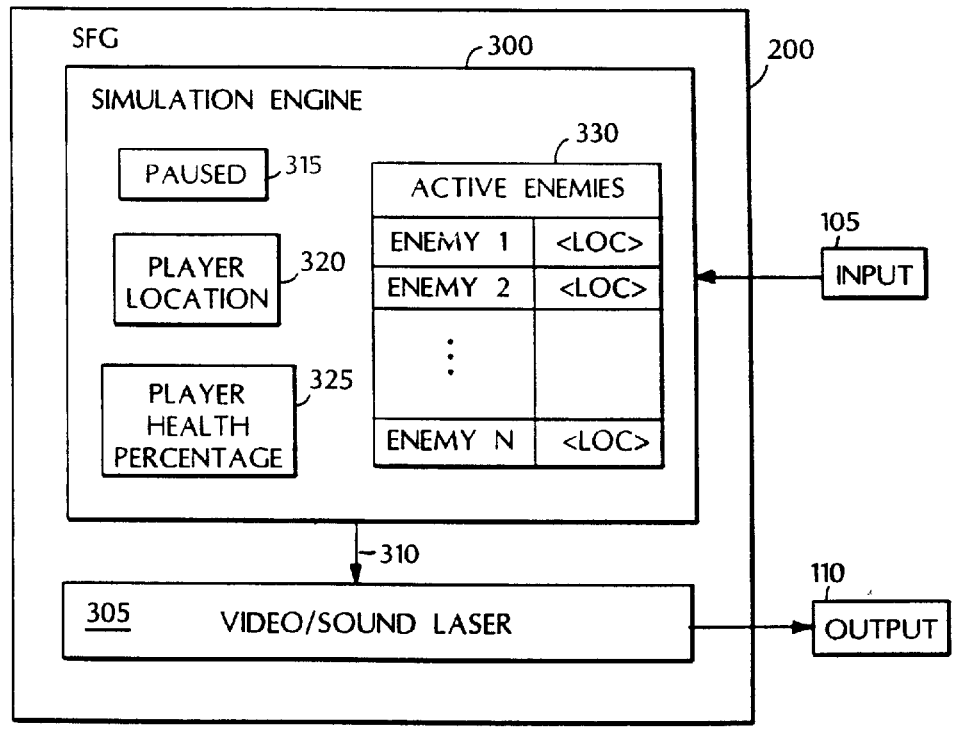
FIG. 3 is a block diagram showing schematic elements of an exemplary single player fighting game.

Referring now to FIG. 3, SFG 200 includes simulation engine 300 and video/sound layer 305. Simulation engine 300 controls the mechanics of the game, including the physics of the game, the behaviors of enemies, navigation, and other workings of the game. Video/sound layer 305 is a layer of code and/or hardware that interfaces to output display 110. Video/sound layer 305 may implement graphics commands such as drawing a line on a video display, drawing a polygon, setting the lighting, and so forth. Video/sound layer 305 may also include audio capabilities such as playing a sound, looping a sound, or stopping the playing of a sound.

Simulation engine 300 includes logic for controlling the progression of SFG 200. Simulation engine 300 receives inputs from user input 105, and controls the output of SFG 200 by making draw/sound calls via channel 310 to video/sound layer 305.

Simulation engine 300 maintains state variables for characterizing the current state of SFG 200. These variables may include PAUSED 315, PLAYER LOCATION 320, PLAYER HEALTH PERCENTAGE 325, and an ACTIVE ENEMIES table 330. PAUSED 315 is a Boolean variable representing whether or not SFG 200 has been paused. PLAYER LOCATION 320 represents the geographical location of the player within a simulated world. PLAYER HEALTH PERCENTAGE 325 is a number within the range zero to one, representing the health of the player. The ACTIVE ENEMIES table 330 lists each of the player's enemies currently active in the simulated world, along with their location in that world. Simulation engine updates these variables during the playing of SFG 200 in a conventional fashion, in response to user inputs.

Figure 4:
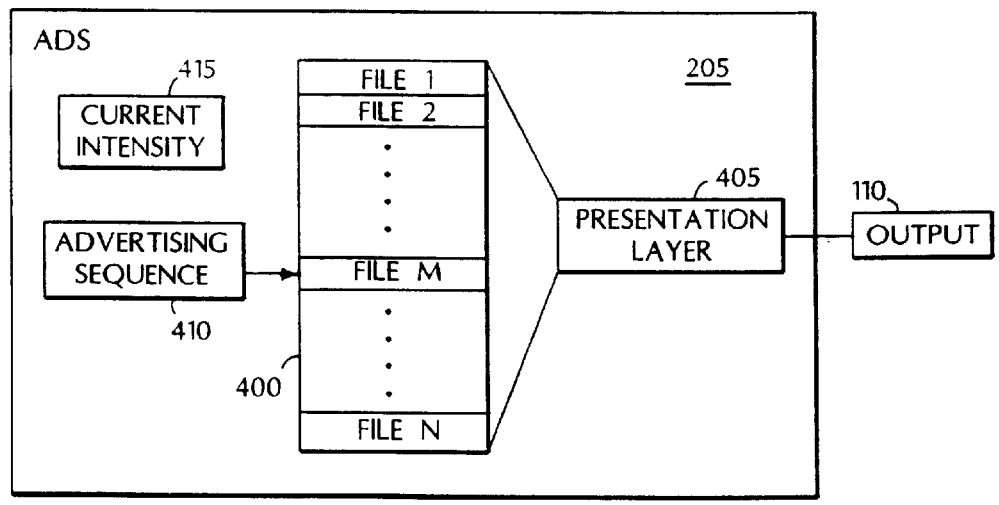
FIG. 4 is a block diagram showing schematic elements of an exemplary advertising delivery system.

Referring now to FIG. 4, ADS 205 includes advertising file library 400, cinematic presentation layer 405, and state variables ADVERTISING SEQUENCE 410, and CURRENT INVOLVEMENT 415.

Advertising file library 400 is a collection of audio visual data files (e.g., Flash animation files, MPEG files, MOV files, or the like) containing advertisements. (Alternatively, the ordered list of files may include program code or scripts for interactively presenting advertisements, or other information, to the user). Cinematic presentation layer 405 includes logic and/or hardware for displaying the information or running the scripts in advertising file library 400 to create audio and/or visual displays on output display 110. In a preferred embodiment, advertising file library 400 includes Macromedia Flash animation files and cinematic presentation layer 405 includes a Flash animation player available from Macromedia, Inc. ADVERTISING SEQUENCE 410 is an ordered list of the advertising file library 400. Included in the list is a pointer indicating which file was most recently displayed to the user, and at what time.

CURRENT INVOLVEMENT 415 is a value representing the dramatic intensity of SFG 200, from the perspective of the player. This variable is computed by the ADS 205 based on information received from the SFG 200. The method for computing this variable will be discussed in more detail below.

The operation of interactive media system 100 will now be described. As noted above, SFG 200 operates in a conventional fashion by receiving inputs from the user, generating outputs, and updating its state variables to reflect the progress of the game.

Figure 5:
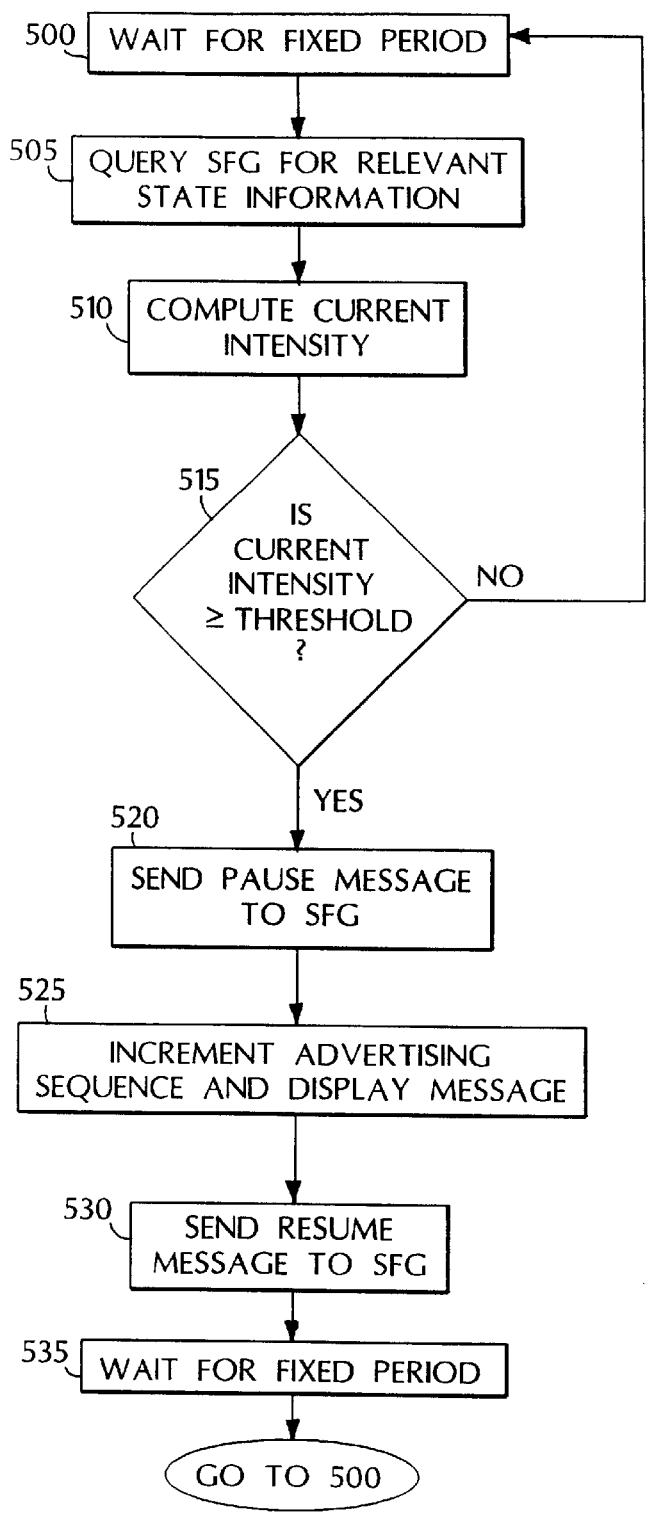
FIG. 5 is a flowchart showing elements of an exemplary method of operation of an advertising delivery system.

The operation of ADS 205 will be described with reference to FIG. 5. ADS 205 operates in parallel with SFG 200. This may be accomplished by implementing ADS 205 on separate hardware or by timesharing the resources of common hardware. As can be seen, ADS 205 operates as a continuous loop. First, ADS 205 waits for a fixed period of time (e.g., one second) (step 500). After waiting, ADS 205 queries SFG 200 for relevant state information, including the values of PLAYER LOCATION 320, PLAYER HEALTH PERCENTAGE 325, and the ACTIVE ENEMIES table 330 (step 505). Using these values, ADS 205 computes a new value for CURRENT INVOLVEMENT 415 (Step 510).

Figure 6:
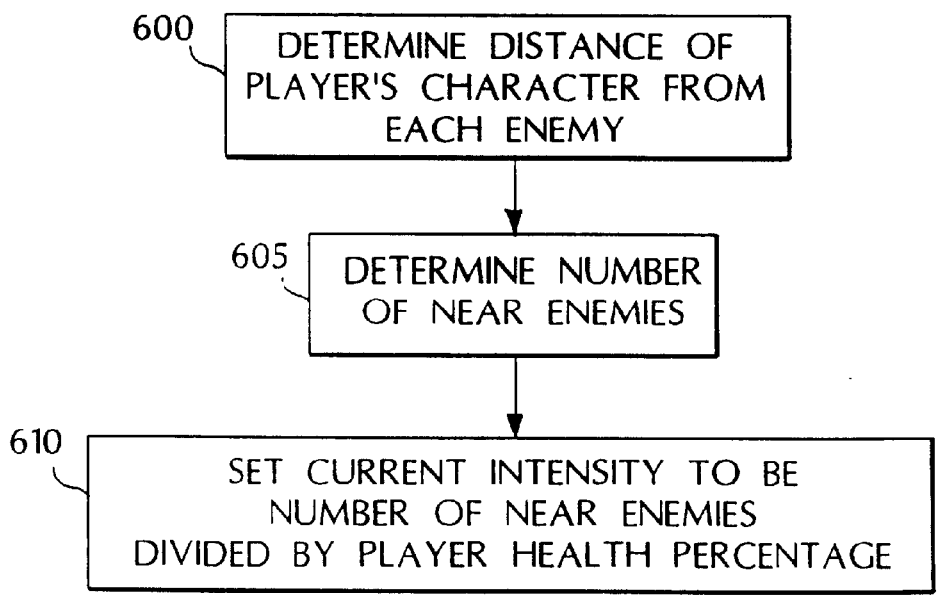
FIG. 6 is a flowchart showing elements of an exemplary method of operation of an advertising delivery system.

Referring now to FIG. 6, CURRENT INVOLVEMENT 415 may be computed as follows. First, the distance from the player of each enemy in the ACTIVE ENEMIES table 330 is computed (step 600). Next, the number of "near enemies" is determined by counting the number of enemies within a specific distance of the player (e.g., 10 meters) (step 605). CURRENT INVOLVEMENT 415 is then set to be the number of near enemies divided by PLAYER HEALTH PERCENTAGE 325 (step 610). This formula for determining CURRENT INVOLVEMENT 415 is useful because it reflects a likelihood that a player will be eliminated from the game in the near term. (A weak player surrounded by many enemies is much more likely to be eliminated than a strong player with few nearby enemies). CURRENT INVOLVEMENT 415 therefore correlates to the dramatic intensity of the game from the perspective of the player, and thus to the likely player interest in the game at that moment. Of course any formula for computing CURRENT INVOLVEMENT may be chosen that correlates to likely short term change in fortunes of a player or to other measures of dramatic intensity of the game.

Referring again to FIG. 5, it is determined whether CURRENT INVOLVEMENT 415 is greater than a fixed threshold, e.g., 8 (step 515). If CURRENT INVOLVE- MENT 415 is less than the threshold, then control returns to step 500. If CURRENT INVOLVEMENT 415 is greater than or equal to the threshold, then the following steps are taken. First ADS 205 sends a "pause" message to SFG 200 (step 520). This causes SFG 200 to pause and to cease generating outputs on output display 110. Then the ADVERTISING SEQUENCE 410 pointer is incremented to point to the next audio-visual file and that file is displayed through cinematic presentation layer 405 (step 525). After the file has finished displaying, the ADS sends a "resume" message to SFG 200, causing it to resume operating at the point where it previously paused (step 530). ADS 205 then waits for a fixed period of time (e.g., five minutes) (step 535), before returning to step 500. This allows a reasonable period of time to pass before another advertisement is shown.

The system and method described advantageously provides a mechanism for inserting advertising material in an interactive media system by monitoring state variables of the system to determine moments of particularly high dramatic intensity for a user and inserting the advertising material at those moments.

Other embodiments are within the scope of the invention and of the claims.

In one variation, the ADS considers, in addition to a measure of intensity, a further measure of "urgency," when determining whether to insert an advertisement at a given moment. The urgency of a situation depends on whether or not the player is required to take some action immediately in order to avoid a problem. Thus, in the SFG example above, the urgency of a situation may be defined as a Boolean variable that is TRUE when the player's character is within line of sight of at least one of his enemies. The value can easily be calculated from existing data about the locations of characters walls and obstacles. In this embodiment, the advertising message would only be inserted when the intensity was over the threshold, but there was no urgency. In this way, the advertising message would not interrupt the player in the midst of an urgent situation, which might make the player more willing to pay attention to the message.

Alternatively, advertising messages could be inserted even when the situation was an urgent one, however the SFG could be instructed by the ADS to reposition the player's character to a non-urgent location (e.g., a location that is not in sight of any enemy) before resuming the play of the game. In this way, a player who was about to be attacked when the advertising message was being inserted, would not be instantly killed at the moment the game resumed.

In another variation, the SFG would maintain a moving record of the last fifteen seconds of activity in the game. When the SFG is resumed after an advertising message has been displayed, the prior fifteen seconds of the game are replayed to the user (with an appropriate signal that the game is in "replay" mode), after which control is returned to the user who continues to play the game from the point at which the advertising message was inserted.

Another variation is to make the choice of advertisement depend on the context of the game at the time of selection. For example, product placement could be done where certain specific advertisements were associated with particular enemies or locations. If the ADS were to determine it appropriate to insert an advertisement while the player was within a certain location or near a certain enemy, the specific advertisement for that location or enemy could be selected. Thus, for example, a peanut butter advertisement could be displayed when the player was fighting a peanut butter monster. Another variation could have a special sequence of higher priced or deluxe advertisements play in conjunction with fighting all the boss enemies.

One could also change the pacing of presentation of advertisements. Instead of a fixed number of minimum minutes, the function changes that minimum interval over time, including letting the minimum interval and the intensity interact. Thus, the system might wait a fixed amount of time for normally intense situations, but when a big tough boss with a special advertisement comes along, the system would lower the amount of time that is required to pass. Alternatively, the ADS 205 could increase the frequency of the advertisements over time, on the assumption that the player is more invested later in the game, and thus will allow more advertising. Likewise, an ADS 205 might disable advertising near the end of the game. This might make the game more attractive to buyers who have been overwhelmed by advertising in the most interesting moments of the game.

In another alternative embodiment, situations of artificial intensity could be created by the ADS at a time when an advertising message is to be inserted. Thus, if the intensity does not reach the threshold after some fixed interval of waiting, the ADS could instruct the SFG to increase the intensity by, e.g., placing more enemies in the vicinity of the player. The determination of when to artificially increase the intensity in this manner may alternatively be based on other information about the state of the game, e.g., the amount of time left in the game.

The above-described embodiments are enhancements of a Single-Player Fighting Game. However these enhancements can also be applied to other forms of games and interactive media. The following examples illustrate some of these possibilities.

EXAMPLE

First Text-Based Interactive Fiction Game

In another embodiment, the game is the story-based interactive fiction game, similar to the DEADLINE(TM) game available from Activision Inc. of Santa Monica, Calif. This is a single player game that is based on text input and output. The user types text to perform actions. The game prints text output to show the results of those actions, to describe the world, and to describe the actions of the various characters in the story. In the discussion that follows, we describe an embodiment that is a modified version of the DEADLINE(TM) game. However it will be apparent to those of skill in the art that the techniques described here may be applied to any text based interactive fiction game.

This embodiment is a murder mystery where the user must use physical evidence and confessions to make a case against the guilty suspects, and then arrest them. The deceased is Mr. Robner, a rich businessman. The prime suspects are: George, his son; Mr. Baxter, his business partner; and Ms. Dunbar, his personal secretary. As it turns out, Mr. Robner was poisoned by Ms. Dunbar. She put the medicine Loblo in his evening tea, which combined lethally with his normal medicine, Ebullion. As she slept the night of the murder, her lover, Mr. Baxter, put a ladder against the library balcony, scraping the outside of the railing as well as leaving holes in the mud below, climbed on the balcony leaving muddy footprints, and went into the library, where the dead Mr. Robner lay. He locked the door from the inside to make it look like a suicide, then took away the incriminating teacup, switching it for a fresh cup. Unfortunately, as he made his way back down the ladder, he dropped the cup and it broke. He left behind a few fragments.

To solve the mystery, the user must find all those clues, as well as figure out the motives of the murderers. Once the user finds the cup fragments as well as the ebullion (in the initial death reports) and loblo (in Dunbar's medicine cabinet), she can have the fragments analyzed for either or both. This puts suspicion on Dunbar. There is also a note pad in the library that can be rubbed with a pencil and a calendar that can be read. This reveals Mr. Robner's plans to change his will to leave out his son, George. This puts suspicion on his son, George. The user shows the calendar to George, who starts to act nervously and eventually leads the user to Robner's secret safe. In the process, the user catches George trying to destroy the will. (Though George is not the murderer.) The user also finds the Focus papers indicating conflict between Mr. Robner and Mr. Baxter, providing a motive for Mr. Baxter. The user must show these Focus papers to Mr. Baxter. The user must show the Loblo Report to Ms. Dunbar. Once these are done, the user must catch Dunbar dropping a theatre ticket that confirms the link between the two lovers, and then show it to her. This leads to the final sequence of arresting Ms. Dunbar and Mr. Baxter successfully.

In this embodiment, the ADS applies a CURRENT INVOLVEMENT function to compute the CURRENT INVOLVEMENT for the user according to features of the unfolding plot of the story.

The plot of Deadline is made up of several key moments in the story. These are called key EVENTS or simply EVENTS. The ADS uses these EVENTS to measure the CURRENT INVOLVEMENT at a given moment. The EVENTS are experienced by the user as actions the user types followed by text output from the system. Sometimes the text output occurs immediately and sometimes the EVENT text is delayed. The underlying simulation will record when such EVENTS happen in a structure called the EVENT HISTORY. The EVENT HISTORY is a list of the key EVENTS that have happened so far, including the time each happened. The ADS uses the EVENT HISTORY to calculate the CURRENT INVOLVEMENT.

In general, a CURRENT INVOLVEMENT function for a text based interactive fiction game may be constructed by first selecting a set of key moments for the game story, and building a CURRENT INVOLVEMENT function that uses them.

Here is an exemplary list of EVENTS in a game similar to Deadline:

MUD=find muddy footprints in library area
HOLES=find the holes below the balcony
PAINT=find the scraped paint on the balcony railing
NOTEPAD=find and rub the note pad with a pencil
FRAGS=find the fragments of the ceramic cup
LADDER=find and examine the ladder in the shed
LOBLO=find the medicine Loblo in Dunbar's medicine cabinet
AFL=receive report from analyzing the fragments for Loblo
AFE=receive report from analyzing the fragments for Ebullion
FOCUS=find the Focus Scandal papers
MERGER=discuss the Focus merger with Baxter
CALENDAR=see the calendar notation
CONFRONT DUNBAR=show the AFL report to Ms. Dunbar
CONFRONT GEORGE=show the calendar to George
CATCH GEORGE=catch George trying to destroy the will
TICKET=show the ticket to Ms. Dunbar In this embodiment, the CURRENT INVOLVEMENT function is updated whenever there is a change in the state of the game. The CURRENT INVOLVEMENT function may be calculated by determining whether one of the enumerated EVENTS has happened recently. If the last EVENT has happened within the past 20 seconds then CURRENT INVOLVEMENT=10. Otherwise it is 0. (In this embodiment, the ADS periodically polls the game engine to ascertain the value of CURRENT INVOLVEMENT. The 20 second "active" period of a CURRENT INVOLVEMENT score in this embodiment insures that the ADS will detect the score of "10" before it reverts to zero. In an alternative embodiment, the game engine could notify the ADS whenever there is a change in the value of CURRENT INVOLVEMENT).

This embodiment gives a simple CURRENT INVOLVEMENT function that allows commercials to be shown at all of the key EVENTS. A shortcoming of this method is that some EVENTS are only really involving for a user depending on the context, and therefore commercials may be shown at times in which the user is not highly involved in the game.

EXAMPLE

Second Text-Based Interactive Fiction Game

In a second text-based interactive fiction game embodiment, an EVENT's contribution to the CURRENT INVOLVEMENT is calculated based on its context in the plot. As with the previously discussed embodiment, the threshold can be altered to increase the chance that an advertisement is shown.

In this embodiment, the CURRENT INVOLVEMENT function is determined whenever the state of the game changes by calculating four separate scores of the EVENT HISTORY and adding these scores together to form the CURRENT INVOLVMENT. (In other embodiments there may be more, fewer, or different scores, depending on the plot.)

If the latest EVENT happened within the past 20 seconds then the CURRENT INVOLVEMENT is the sum of the four scores. Otherwise, it is 0. As noted above, keeping non-zero scores "alive" for 20 seconds insures that the ADS will detect the change in CURRENT INVOLVEMENT when it polls the game engine. We summarize the four scores as follows.

(a) THOUGHT—This score measures whether the last two EVENTS of the EVENT HISTORY are related in the thoughts of a user. For example, if the user finds the calendar, then shows it to George, these two EVENTS are connected in the plot since both are related to George.

(b) OPTIONS—This score measures whether the last EVENT of the EVENT HISTORY changes the user's goals. This means either successfully achieving a goal, or getting a new goal, or both.

(c) MOTIVATION—This score measures whether the user's actions are motivated by her goals.

(d) EMOTIONAL INTENSITY—This score measures whether the user's excitement builds while solving the mystery.

We now describe in more detail how these scores are calculated.

The THOUGHT score reflects the consistency of the user's thought process. Each EVENT is associated with zero or more TOPICS that the user might be thinking about in connection with the occurrence of the EVENT. In general, a list of TOPICS for a particular text-based interactive fiction game may include the major questions that need to be resolved to finish the story presented by the interactive fiction game. For example, in a mystery these would be who did it and how they did it. In the presently describe exemplary embodiment, there are the following five TOPICS:

1. FIND THE CHEMICAL MEANS
2. FIND THE MEANS OF ESCAPE
3. THINK ABOUT DUNBAR BEING GUILTY
4. THINK ABOUT BAXTER BEING GUILTY
5. THINK ABOUT GEORGE BEING GUILTY

The TOPICS are associated with EVENTS as follows:

| EVENT | TOPICS |
|---|---|
| MUD | => 2 |
| HOLES | => 2 |
| PAINT | => 2 |
| NOTEPAD | => 4 |
| FRAGS | => 1 |
| LADDER | => 2 |
| LOBLO | => 1,3 |
| AFL | => 1,3 |
| AFE | => 1 |
| FOCUS | => 4 |
| MERGER | => 3 |
| CALENDAR | => 5 |
| CONFRONT DUNBAR | => 3 |
| CONFRONT GEORGE | => 5 |
| CATCH GEORGE | => 5 |
| TICKET | => 3,4 |

The value of the THOUGHT score is calculated by comparing the TOPICS of the last two EVENTS in the EVENT HISTORY. If there is a non-null intersection, then the THOUGHT score has value 1. Otherwise, the THOUGHT score has value 0.

The OPTIONS score reflects whether the last EVENT of the EVENT history changes the GOALS that are current active. GOALS are Boolean predicates that are defined in terms of EVENTS in the EVENT HISTORY. In general, GOALS represent tasks that the user will want to achieve in view of events that have recently occurred. The OPTIONS scores is 1 if there is a change in the user's goals since the previous turn. Otherwise, the OPTIONS score is 0.

The following is an exemplary list of GOALS for the presently described embodiment, and the states of the EVENT HISTORY that make each GOAL active.

1. TALK TO DUNBAR ABOUT HER LOBLO—This goal is valid from the time the user finds the LOBLO till the time she CONFRONTS DUNBAR (LOBLO to CONFRONT DUNBAR).
2. TALK TO GEORGE ABOUT THE NEW WILL—This goal is valid from the time the user finds the CALENDAR notation indicating there is a new will till the time she confronts George (CALENDAR to CONFRONT GEORGE).
3. TALK TO BAXTER ABOUT BLACKMAIL—This goal is valid from the time the user finds the NOTEPAD indicating that Baxter is being blackmailed till the time that the user discusses the MERGER with Baxter (NOTEPAD to MERGER).
4. CHALLENGE DUNBAR—This goal is valid from the time the user CONFRONTS DUNBAR with the report indicating Loblo with Ebullion is the cause of death till the time she finds the TICKET and Dunbar confesses her AFFAIR with Baxter (CONFRONT DUNBAR to TICKET/AFFAIR).
5. CHALLENGE BAXTER—This goal is valid anytime after the user discusses the MERGER with Baxter (after MERGER).
6. FIND THE MEANS-OF-ESCAPE UPPER—This goal is valid from the time the user finds either the HOLES or the LADDER to the time she sees the MUDdy footprints or the scraped PAINT (HOLES or LADDER to PAINT or MUD).
7. FIND THE MEANS-OF-ESCAPE LOWER—This goal is valid from the time the user find the MUDdy footprints or the scraped PAINT to the time she finds the HOLES (MUD or PAINT to HOLES).
8. FIND CLUES ABOUT DUNBAR—Valid until the user finds the LOBLO (until LOBLO).
9. ANALYZE THE FRAGMENTS FOR EBULLION—Valid from the time the user finds the FRAGmentS till the time she actually does the Analysis For Ebullion (FRAGS to AFE).
10. ANALYZE THE FRAGMENTS FOR LOBLO—Valid from the time the user has found both the FRAGmentS and the LOBLO till the time she does the Analysis For Loblo (FRAGS and LOBLO to AFL).
11. FIND MYSTERY SUBSTANCE ON THE FRAGMENTS—Valid from the time the user gets the Analysis For Ebullion report to the time she finds the LOBLO (AFE to LOBLO).

The MOTIVATION score reflects whether a recently occurring EVENT resulted from ACTIVITIES the user was motivated to perform in order to achieve a GOAL. For a given text-based interactive fiction game, a list of ACTIVITIES may be established reflecting possible user actions during the game. Each EVENT may have associated with it one or more of the ACTIVITIES if those ACTIVITIES are necessary for the event to occur. In addition, each GOAL has an associated list of ACTIVITIES if those ACTIVITIES are ones a user would logically engage in to try to achieve the GOAL. An EVENT is said to be "motivated" if at least one of its associated ACTIVITIES is also associated with a currently active GOAL. In addition, some EVENTS may be designated "always motivated," in which case the EVENT is motivated whenever it occurs, irrespective of the currently active GOALS. For example, an EVENT might be designated always motivated where the EVENT itself is a GOAL. The MOTIVATION score is 1 if the last EVENT of the EVENT HISTORY is motivated. Otherwise, it is 0.

In the present exemplary embodiment, there are seven ACTIVITIES:

| | |
|---|---|
| 1. search the scene of the crime | (s/scene) |
| 2. search the balcony | (s/balc) |
| 3. search outside | (s/out) |
| 4. search dunbar's bedroom | (s/dun) |
| 5. talk to dunbar | (tk/dun) |
| 6. talk to george | (tk/geo) |
| 7. talk to baxter | (tk/bax) |

The following table shows the mapping from the twelve GOALS to their associated ACTIVITIES. Following the name of the GOAL is the set of ACTIVITIES associated with that goal. Recall that the abbreviations for the activities are found above. Some GOALS are associated with more than one ACTIVITY and some give rise to no activities.

| Goal Description | Activity Set |
|---|---|
| TALK TO DUNBAR ABOUT HER LOBLO | tk/dun |
| TALK TO GEORGE ABOUT THE NEW WILL | tk/geo |
| TALK TO BAXTER ABOUT BLACKMAI | tk/bax |
| CHALLENGE DUNBAR | tk/dun |
| CHALLENGE BAXTER | tk/bax |
| FIND THE MEANS-OF-ESCAPE UPPER | s/scene, s/balc |
| FIND THE MEANS-OF-ESCAPE LOWER | s/out |
| FIND CLUES IN GENERAL | s/scene |
| FIND CLUES ABOUT DUNBAR | s/dun |
| ANALYZE THE FRAGMENTS FOR EBULLION | — |
| ANALYZE THE FRAGMENTS FOR LOBLO | — |
| FIND MYSTERY SUBSTANCE ON THE FRAGMENTS | s/scene, s/dun |

The following table show the mapping from EVENTS to ACTIVITIES in the present exemplary embodiment. Note that the EVENTS AFL and AFE are designated "always motivated" because they directly correspond to the GOALS "Analyze the fragments for Ebullion" and "Analyze the fragments for Loblo."

| EVENT | | Activities |
|---|---|---|
| MUD | => | s/scene, s/balc |
| HOLES | => | s/out |
| PAINT | => | s/scene, s/balc |
| NOTEPAD | => | s/scene |
| FRAGS | => | s/out |
| LADDER | => | s/out |
| LOBLO | => | s/dun |
| AFL | => | [always motivated] |
| AFE | => | [always motivated] |
| FOCUS | => | s/scene |
| MERGER | => | tk/bax |
| CALENDAR | => | s/scene |
| CONFRONT DUNBAR | => | tk/dun |
| CONFRONT GEORGE | => | tk/geo |
| CATCH GEORGE | => | tk/geo |
| TICKET | => | tk/dun |

The INTENSITY score reflects the user's likely excitement at learning new FACTS as they pertain to the central mystery of the game. Therefore, this score reflects both what the user knows and what the user suspects. Changes in the user's knowledge may give rise to the surprises and reversals that produce the user's strongest emotions. The EMOTIONAL INTENSITY score can score anywhere from 0 to 70 or so. Therefore, this feature can have more impact on the CURRENT INVOLVEMENT function than the other features. In order to compute the EMOTIONAL INTENSITY score, the system determines the FACTS that the user knows or suspects, and the degree of certainty with which the user has this knowledge. Each known or suspected FACT is given a score, depending on the degree of certainty with which the user knows it, and the importance of the FACT. The greater the certainty, the greater the score. The EMOTIONAL INTENSITY score reflects a change in the sum of all of these scores as a result of the occurrence of an EVENT.

The EMOTIONAL INTENSITY score is determined by reference to a set of FACTS that are important in solving the mystery of the particular game being played. In general the FACTS list for a game may include facts about the game story that are important for the user to know to do well in playing the game. Because different facts may be more or less important to the user, each fact has associated with it a numerical importance. In the present exemplary embodiment, the following FACTS are included in the list (with their associated importance scores):

| FACT | Importance |
|---|---|
| The MEANS OF ESCAPE was over the balcony | (3) |
| The MEANS OF DEATH was Loblo and Ebullion | (4) |
| Baxter had a legitimate MOTIVE | (2) |
| George was actually disinherited | (2) |
| The MEANS OF DEATH was extra Ebullion added into Robner's tea cup | (4) |
| It was a murder, not a suicide | (2) |
| Dunbar is guilty | (5) |
| Baxter is guilty | (5) |
| George is guilty | (5) |

The previous knowledge of the user is based on the EVENT HISTORY. The change in knowledge of a new EVENT is the difference between the knowledge based on the HISTORY, and the knowledge based on prior EVENT HISTORY plus the new EVENT.

A knowledge system is used to describe the various degrees of certainty that a user may have about the facts. The following table reflects 11 potential KNOWLEDGE STATES that a user may have about a fact, along with associated numerical values.

KNOWLEDGE STATE/Abbreviation/Numerical Value

I know for a fact it's true/K/7

I believe it's true/S3/3

It's probably true/S2/2

It's possibly true/S1/1

I have a hunch that it's true/S0/0.5

I know nothing about it/NONE/0.0

I have a hunch that it's false/–S0/–0.125

It's possibly false/–S1/–0.25

It's probably false/–S2/–0.5

I believe it's false/–S3/–0.75

I know for a fact it's false/–K/–1.75

In order to determine the EMOTIONAL INTENSITY score after the occurrence of an event, an sub-score is computed for each change in knowledge about a fact. For each fact that changes, the sub-score is given by multiplying the absolute value of the change in the KNOWLEDGE STATE by the importance of the fact. For example, if a fact with importance 4 changed from S1 (numerical value 1) to K (numerical value 7), then the resulting sub-score would be |7−1|*4=24. The total EMOTIONAL INTENSITY score is thus the sum of all of the sub-scores for all the facts.

In order to determine the appropriate KNOWLEDGE STATE for a given FACT, there is associated with each FACT a KNOWLEDGE FUNCTION that takes as input the EVENT HISTORY and returns the KNOWLEDGE STATE of the user for that fact.

For some facts, the user's KNOWLEDGE STATE may be calculated from just the set of EVENTS that have happened. For others, the user's knowledge is derived from both the set of EVENTS and from the pre-existing KNOWLEDGE STATE for other FACTS.

We now describe the KNOWLEDGE FUNCTIONS in the present exemplary embodiment for the nine facts listed above.

Fact 1: The MEANS OF ESCAPE was over the balcony. Fact 1 depends on four EVENTS: MUD, PAINT, HOLES, and LADDER. Each combination of the four EVENTS leads to a specific knowledge value. The following chart shows how to compute the user's knowledge of Fact 1. The chart shows a list of KNOWLEDGE STATES about Fact 1, and the EVENTS that must have occurred for the user to have that KNOWELDGE STATE about Fact 1.

NONE—
S1—MUD
S1—PAINT
S2—MUD PAINT
S2—HOLES
S3—MUD HOLES
S3—PAINT HOLES
K—MUD PAINT HOLES
NONE—LADDER
S2—MUD LADDER
S2—PAINT LADDER
S3—MUD PAINT LADDER
S2—HOLES LADDER
S3—MUD HOLES LADDER
S3—PAINT HOLES LADDER
K—MUD PAINT HOLES LADDER

For the remaining Facts, we describe the KNOWLEDGE FUNCTION for each fact using pseudo code. This pseudo code employs two predicates: Happened(EVENT A) is true if the argument EVENT A has already happened. EVENT A Precedes EVENT B is true if EVENT A happened before EVENT B.

```
Fact 2: THE MEANS OF DEATH WAS LOBLO AND EBULLION
KnowledgeOfFactTwo (EVENT HISTORY)
    if (Happened (AFL) and
        Happened (FRAGS) and
        Happened (LOBLO))
        then return K
    if (Happened (FRAGS) and Happened (LOBLO))
        then return S2
    if (Happened (FRAGS)) then return S0
    else return NONE
Fact 3: BAXTER HAD A LEGITIMATE MOTIVE
KnowledgeOfFactThree (EVENT HISTORY)
    if (Happened (FOCUS) and
        (Happened (MERGER) or Happened (NOTEPAD)))
        then return K
    if (Happened (NOTEPAD) and
        Happened (MERGER) and
        NOTEPAD Precedes MERGER)
        then return S2
    if (Happened (NOTEPAD))
        then return S3
    if (Happened (FOCUS) or Happened (MERGER))
        then return S0
    else return NONE
Fact 4: GEORGE WAS ACTUALLY DISINHERITED
KnowledgeOfFactFour (EVENT HISTORY)
    if (Happened (CALENDAR) and
        Happened (CONFRONT GEORGE) and
        Happened (CATCH GEORGE))
        then return K
    if (Happened (CALENDAR) and
        Happened (CONFRONT GEORGE))
        then return S3
    if (Happened (CALENDAR))
        then return S2
    else return S0
Fact 5: THE MEANS OF DEATH WAS EXTRA EBULLION (added
into Robner's tea cup)
KnowledgeOfFactFive (EVENT HISTORY)
    if (Happened (FRAGS) and
        Happened (LOBLO) and
        (Happened (AFE) or Happened (AFL)))
        then return -K
```

```
if (Happened (FRAGS) and
    Happened (AFE))
    then return -K
if (Happened (LOBLO))
    then return NONE
if (Happened (FRAGS))
    then return S1
else return NONE
```

Fact 6 introduces the concept of deriving the user's knowledge from previously calculated knowledge levels. It also introduces the function HALF that maps any knowledge level into another about half as certain. The implementation (mapping) of HALF is given below. The MAX knowledge level is the one with the maximum numerical representation.

```
HALF: RETURN KNOWLEDGE VALUE WITH HALF CERTAINITY
Half (knowledge):
    if (knowledge = K) return S2
    if (knowledge = S3 or S2) return S1
    if (knowledge = S1) return S0
    if (knowledge = S0 or NONE or -S0)
        return NONE
    if (knowledge = -S1) return -S0
    if (knowledge = -S3 or -S2) return -S1
    if (knowledge = -K) return -S2
Fact 6: IT WAS A MURDER, NOT A SUICIDE
KnowledgeOfFactSix (EVENT HISTORY)
    if (nothing has happened)
        then return -S2
    else return Max (KnowledgeOfFact1( ),
            KnowledgeOfFact2( ),
            Half (KnowledgeOfFact3( )),
            Half (KnowledgeOfFact4( )))
Fact 7: DUNBAR IS GUILTY
KnowledgeOfFactSeven (EVENT HISTORY)
    if (Happened (TICKET/AFFAIR))
        then return K
    if (Happened (CONFRONT DUNBAR))
        then return S2
    if (Happened (LOBLO))
        then return S1
    if (KnowledgeOfFact2( ) = K or S3)
        then return S0
    else return NONE
Fact 8: BAXTER IS GUILTY
KnowledgeOfFactEight (EVENT HISTORY)
    if (Happened (TICKET/AFFAIR))
        then return K
    if (Happened (MERGER))
        then return S2
    else return NONE
Fact 9: GEORGE IS GUILTY
KnowledgeOfFactNine (EVENT HISTORY)
    if (KnowledgeOfFact7( ) = K or
        KnowledgeOfFact8( ) = K)
        then return -K
    else return Max (Half (KnowledgeOfFact1( )),
            Half (KnowledgeOfFact2( )),
            Half (KnowledgeOfFact4( )))
```

As described above, for the first 20 seconds after an EVENT, the total value of the CURRENT INVOLVEMENT function is equal to the sum of the four scores added together. After twenty seconds, the value of the CURRENT INVOLVEMENT function is zero. As above, this is enough time to ensure that the advertisement will trigger even while using a polling mechanism.

In another embodiment, there is a component that can calculate whether a next EVENT is likely to happen in the near future. For example, if the user has the CALENDAR and is in the same physical room as George, this component will recognize that CONFRONT GEORGE might be about to happen. When this happens, the CURRENT INVOLVEMENT function is calculated as though the predicted EVENT has actually happened. If the CURRENT INVOLVEMENT exceeds the threshold, then an advertisement is shown. This allows the ADS to anticipate key EVENTS and show the advertisement before the key EVENT happens.

In another embodiment, there is a component that calculates when the next EVENT is just about to happen. For example, if the user has typed "show the calendar to george" (and is near george and has the calendar) the component indicates that CONFRONT GEORGE is happening, and the output is about to be shown. Instead of waiting till after the text is shown to show the advertisement, the ADS will show the advertisement in between the user's input and the system's output.

EXAMPLE

Graphical Adventure Game

In another embodiment, the game is a graphical adventure game, such as the ESCAPE FROM MOKEY ISLAND(TM) game (Lucas Arts). This is similar to a text based game, but the input includes graphics and the mouse, and the output includes graphics and sound. The CURRENT INVOLVEMENT function has the same form, but the specific EVENTS, etc, are different, according to the plot of the adventure game.

EXAMPLE

Location Based Entertainment Game

In another embodiment, the game is a graphical Location Based Entertainment (LBE) such as Disney's PIRATES OF THE CARIBBEAN VR adventure. As with the graphical adventure game, the CURRENT INVOLVEMENT function has the same form, but the specific EVENTS, etc, are different, according to the plot of the entertainment.

EXAMPLE

Multi-Player Fighting Game

In another embodiment, the game is a Multi-Player Fighting Game (MFG), for example the QUAKE III(TM) Arena game. An MFG is like an SFG except that multiple players participate in the simulated environment, which may or may not also include non-player (i.e., computer controlled) characters. Such games typically are played by users connected over a computer network, each user participating through a separate client computer system and the simulation engine and ADS running on a central server computer. The central server determines the appropriate display on each player's client system and sends appropriate commands to those systems to create such displays.

In this embodiment, the ADS could compute the CURRENT INVOLVEMENT for each player as follows. For each player that is within a specified distance of another player, the ADS checks if that player's HEALTH PERCENTAGE just went below 10 percent (i.e., was at or above 10 percent on the previous check and is now below 10 percent). Were this were true, it would be a moment when one player seems close to losing a fight, so it is likely to be a tense moment, and CURRENT INVOLVEMENT would be set above the threshold (e.g., to 10). If this were not true, CURRENT INVOLVEMENT would be set to zero. If any player's CURRENT INVOLVEMENT is set above the threshold, the simulation engine is paused and all of the players will see an advertisement displayed on their clients, after which the game resumes, in a similar fashion as described in connection with the SFG embodiment above. (Notice that in this embodiment a step function is used instead of a continuous function. Either type of function may be used as appropriate in the context.)

EXAMPLE

Turn-Based Strategy Game

In another embodiment, the game is a Turn-Based Strategy Game (TBS). The TBS has a single player, but instead of continuous fighting action, the game is concerned with more strategic matters that evolve turn by turn. Typically a TBS uses a third-person presentation of a larger geographical area, with additional sub-screens to present other information. An example of this type of game is the CIVILIZATION II(TM) game.

This TBS embodiment is similar to the SFG embodiment but may differ in two ways. First, because the game is not played in real time, CURRENT INVOLVEMENT values may be calculated after each player turn, alternatively they may be calculated at fixed intervals. Second, the variables used to calculate CURRENT INVOLVEMENT may differ. For example, in a game in which a player may capture cities or gain technologies, CURRENT INTENSTIY may be set above the threshold after any turn in which the number of cities or technologies possessed by a player changes. Alternatively, or in addition, if the player may collect units or points during the game, CURRENT INVOLVEMENT may be set above the threshold when the number of units or points changes by more than a set amount on a single turn (e.g., five). These measures are appropriate for determining CURRENT INVOLVEMENT because they correlate with a significant change in the fortunes of a player in the game, and thus to times when player interest is likely to be greatest.

EXAMPLE

Two-Player Sports Game

In another embodiment, the game is a two-player sports game on a console (2PSG). The 2PSG has two players competing at a simulated sports game. There is continuous action with occasional breaks from the nature of the rules of the game (e.g. after a goal is scored). Typically a 2PSG uses a third-person perspective to present the field of play, as well as sub-screens to present alternate views (e.g., a field "radar" view). An example of this type of game is the INTERNATIONAL SUPER STAR SOCCER(TM) game for the SONY PLAYSTATION(TM) game console.

In this embodiment, the simulation engine maintains state variables representing the state of the simulated game, including the score of each player's team, the location of the ball, whether the ball is "in play," which team has possession of the ball, and the location of the various players. Referring now to FIG. 7, the CURRENT INVOLVEMENT of the game may be calculated as follows. First, it is determined whether the ball is (a) not in play, (b) in the six yard box, or (c) not possessed by either team (step 700). If any of these is true, the CURRENT INVOLVEMENT is set to be zero (step 705). If none is true then the distance D from the ball to the defending team's goal (in meters) is computed and the CURRENT INVOLVEMENT is initially set to 120/D (step 710). (D may be adjusted to that it is never below 1.0 to prevent extremely high values for CURRENT INVOLVEMENT). The CURRENT INVOLVEMENT is then adjusted based on the number of players behind the ball, by dividing the CURRENT INVOLVEMENT by a factor of the number of defending players between the ball and the defending team's goal (e.g. by ⅕ that number) (step 715). The CURRENT INVOLVEMENT may then also be adjusted by based on the relative score (step 720). Thus, if the defending team is currently leading the CURRENT INVOLVEMENT could be multiplied by 1.25 whereas if the defending team is currently losing, the CURRENT INVOLVEMENT could be multiplied by 0.75. Thus, the current involvement function basically calculates how far the ball is from the defending goal, modified by number of defenders "behind" ball and relative score of the two teams. These values are correlated to the likelihood of a player scoring, and of a trailing player tying the score, both of which are significant changes in player fortunes, and thus are relevant to the intensity of player interest in the game.

EXAMPLE

Online Chess Game

In another embodiment, the game is online chess between two players (OC). OC displays the current board position to each player, and has a text area for chatting and other commands. An example of this type of game is the Free Internet Chess Server at the freechess web site. The CURRENT INVOLVEMENT of this game is determined by whether either player is in "check." If a player is in "check", the current involvement is ten, otherwise it is zero. Since putting a player in check often results in a change in the relative fortunes of players in the game (e.g., by forcing a player to lose a piece), it creates greater player interest in the following move, and thus is an appropriate determinant for CURRENT INVOLVEMENT.

EXAMPLE

Mobile Telephone Game

In another embodiment, the game is played on a mobile telephone. Here the user input 105 is the telephone's keypad and the output display 110 is the telephone's screen. An example of this type of game is the SNAKE(TM) game on NOKIA(TM) mobile telephones. In this embodiment, the advertising file library 400 may be stored in the telephone, or elements of the library may be downloaded into the phone via the telephone network to which the phone is connected. In the example Snake game, every time the snake eats food, it grows in length by one, and points are scored. The snake cannot hit the edge of the screen, any walls, or its own tail. The game keeps track of the current score and the high score. Also, there is a food points number that represents how many points are gained for each piece of food that the snake eats. In this embodiment, the CURRENT INVOLVEMENT is based on getting close to the high score. Players derive psychological satisfaction from beating their own prior high score, and thus are likely to be more interested in the game if doing so is likely If the player will exceed the high score with the next piece of food eaten, this is an intense moment appropriate for advertising insertion.

In a mobile telephone game, the content of the advertising message may be modified based on the location of the user, which may be made available to the cellular telephone by the telephone network with which it is associated. (Such networks must be aware of the location of the user for billing purposes). For example, the content of the advertising message could determined to include a message from a business that is local to the user's location. Alternatively, the content of the message could be based on the time and social custom of the particular location where the user is located. For example, if it is dinner time in the particular location where the customer is located, the content of the message could be made to include information about dining choices at that location.

In another embodiment, the content of the message can be determined based on information from a user profile previously filled out by the user containing, e.g., user interests.

A number of embodiments of the invention have been described. Nevertheless, it will be understood that various modifications may be made without departing from the spirit and scope of the invention. Accordingly, other embodiments are within the scope of the following claims.

What is claimed is:

1. In a data processing system executing an online real-time discussion process for interacting with at least one user, the method comprising monitoring data about the rate of message traffic in the medium, using the monitored data to determine a time to display a message to the user, and displaying the message to the user.

2. The method of claim 1, wherein monitoring data about the rate of message traffic in the medium comprises determining the rate of message traffic in the medium relative to the number of users of the medium.

3. In a data processing system executing a process for interacting with at least one user, the method comprising:
    (a) executing the process for a period of time;
    (b) monitoring data about the process;
    (c) during execution of the process, repeatedly forming a measure of the likely intensity of the user's interaction with the process based on the data; and
    (d) selectively displaying a message to the user based on the value of the measure,
    wherein the process comprises a simulated team game, and wherein forming a measure of likely intensity comprises determining a measure of a likelihood of a player scoring.

4. In a data processing system executing a process for interacting with at least one user, the method comprising:
    (a) executing the process for a period of time;
    (b) monitoring data about the process;
    (c) during execution of the process, repeatedly forming a measure of the likely intensity of the user's interaction with the process based on the data; and
    (d) selectively displaying a message to the user based on the value of the measure,
    wherein the process presents an interactive drama to the user, wherein the message is not part of the dramatic storyline and wherein forming a measure of likely intensity comprises providing an association between events that have occurred within the interactive drama and a representation of goals that a user is likely to have, updating the representation in response to events within the interactive drama, and monitoring changes in said representation in response to said updating.

5. In a data processing system executing a process for interacting with at least one user, the method comprising:
    (a) executing the process for a period of time;
    (b) monitoring data about the process;
    (c) during execution of the process, repeatedly forming a measure of the likely intensity of the user's interaction with the process based on the data;

(d) selectively displaying a message to the user based on the value of the measure;

(e) determining at least one waiting interval; and (f) after selectively displaying the message, waiting for a determined waiting interval before selectively displaying further messages, further comprising determining the waiting interval according to an estimate or measure of likely intensity of the user's interaction with the process.

6. In a data processing system executing a process for interacting with at least one user, the method comprising:

(a) executing the process for a period of time;

(b) monitoring data about the process;

(c) during execution of the process, repeatedly forming a measure of the likely intensity of the user's interaction with the process based on the data; and (d) selectively displaying a message to the user based on the value of the measure, further comprising determining an appropriate time for displaying the message and, in response to the determination, increasing the likely intensity of the user's interaction by modifying the state of the process.

7. A computer program product, tangibly stored on a computer-readable medium, for inserting a message during a user interactive process, the product comprising instructions operable to cause a programmable processor to:

(a) execute the process for a period of time; and (b) monitor data about the process (c) during execution of the process, repeatedly form a measure of the likely intensity of the user's interaction with the process based on the data; and (d) selectively display a message to the user based on the value of the measure, further comprising instructions operable to cause a programmable processor to determine an appropriate time for displaying the message and, in response to the determination, increase the likely intensity of the user's interaction by modifying the state of the process.

8. A data processing system for inserting a message during a user interactive process comprising:

(a) means for executing the process for a period of time; and (b) means for monitoring data about the process (c) means for, during execution of the process, repeatedly forming a measure of the likely intensity of the user's interaction with the process based on the data; and (d) means for selectively displaying a message to the user based on the value of the measure wherein the process is a game process, and wherein the message does not refer to a state of the game, further comprising means for determining an appropriate time for displaying the message and, in response to the determination, increasing the likely intensity of the user's interaction by modifying the state of the process.

* * * * *